United States Patent [19]

Desai

[11] Patent Number: 4,970,547
[45] Date of Patent: Nov. 13, 1990

[54] SYSTEM AND METHOD FOR GENERATING AND CODIFYING PHOTO CROPPING AND ENLARGEMENT INFORMATION

[75] Inventor: Basavaraj R. Desai, Knoxville, Tenn.

[73] Assignee: Visicon, Inc., Powell, Tenn.

[21] Appl. No.: 482,192

[22] Filed: Feb. 20, 1990

[51] Int. Cl.$^5$ ............................................. G03B 27/52
[52] U.S. Cl. .......................................... 355/61; 355/74; 355/75
[58] Field of Search ........................ 355/61, 62, 72, 75, 355/74

[56] References Cited

U.S. PATENT DOCUMENTS

| | | | |
|---|---|---|---|
| 1,266,060 | 5/1918 | Schwab | 355/61 |
| 1,330,353 | 2/1920 | Smith | |
| 1,679,927 | 8/1928 | Bell et al. | |
| 2,494,077 | 1/1950 | Wilkinson | 88/24 |
| 2,552,460 | 5/1951 | Rodman | 33/80 |
| 2,560,937 | 7/1951 | Ens | 33/98 |
| 3,124,997 | 3/1964 | Morton | 88/24 |
| 3,620,624 | 11/1971 | Acker | 355/61 |
| 3,878,615 | 4/1975 | Peterson | 33/95 |
| 4,171,573 | 10/1979 | Picciotto | 33/1 B |
| 4,595,285 | 6/1986 | Miwa et al. | 355/61 |
| 4,704,796 | 11/1987 | Gauer | 33/1 B |

Primary Examiner—Monroe H. Hayes
Attorney, Agent, or Firm—Luedeka, Hodges & Neely

[57] ABSTRACT

A system and method for generating and codifying cropping and enlargement information for a rectangular photograph utilizes at least one transparent overlay and a grid board for underlying the overlay. The overlay includes markings providing a plurality of rectangular windows arranged about a common center and identification indicia for identifying each window and the enlargement multiple necessary to enlarge the window to a predetermined photo size. The grid board has a flat surface bearing a pair of intersecting lines which divide the surface into four quadrants about the center of the board surface, and one quadrant of the board bears a pattern of markings which provides the one quadrant with a two-coordinate grid and indicia for identifying coordinate locations on the grid. To use the system, the transparent overlay is positioned over the board so that the common center of the windows overlies the center of the board and then the photo is manipulated between the overlay and the board surface until the preselected area of the photo desired to be enlarged is suitably framed by a chosen one of the rectangular windows. By noting the identification indicia corresponding to the chosen window and the location on the board grid overlain by a corner of the photo, one possesses sufficient information to accurately isolate the selected area of the photo at a later time for enlargement purposes.

8 Claims, 4 Drawing Sheets

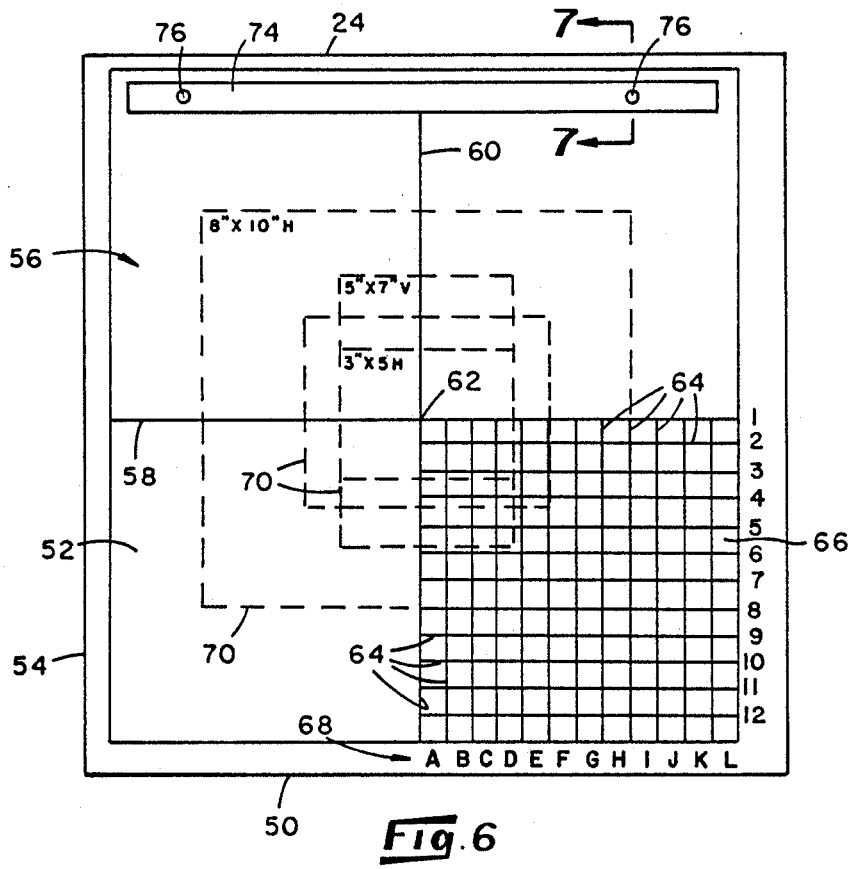
Fig. 6
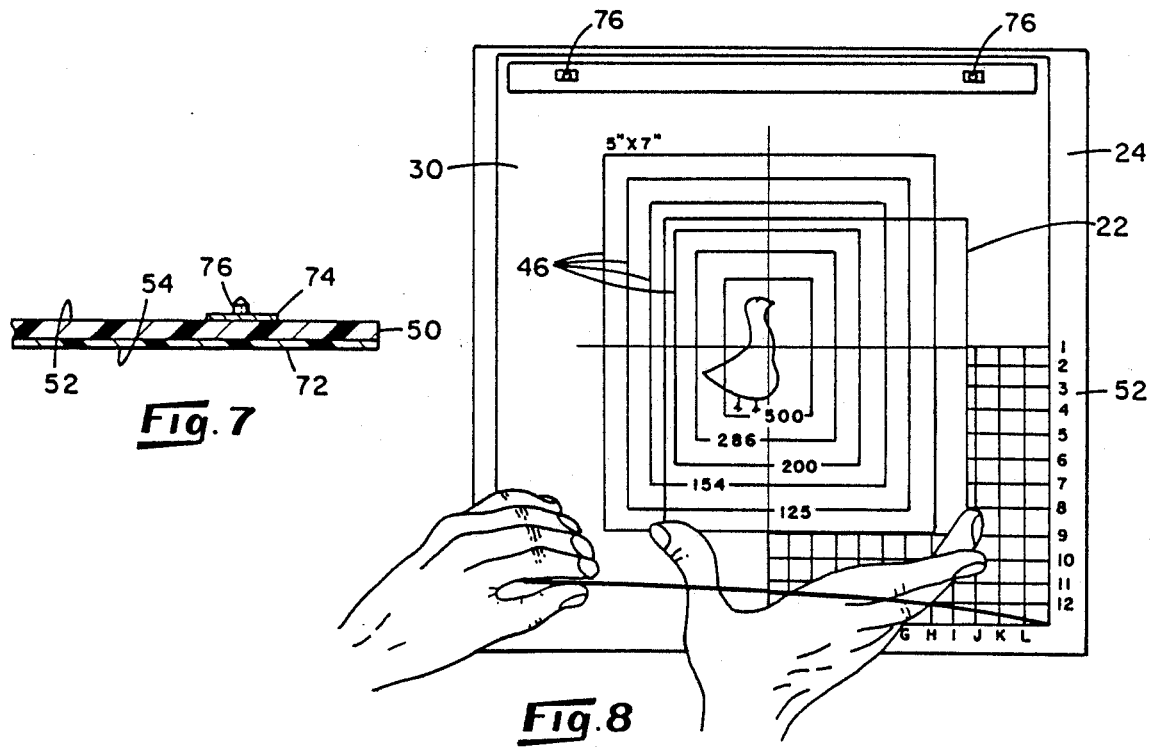
Fig. 7
Fig. 8

SYSTEM AND METHOD FOR GENERATING AND CODIFYING PHOTO CROPPING AND ENLARGEMENT INFORMATION

This invention relates generally to photography accessories and more particularly to a system and method for generating and codifying cropping and enlargement information for a photograph.

For an individual to obtain an enlargement of a selected area of a photograph, the individual commonly takes his photograph to a photo shop where the necessary cropping information is generated and recorded. Normally, much detailed information regarding the photo area to be cropped and enlarged is accumulated and recorded in order that the area to be enlarged may be accurately isolated at a later time. In some instances, the photograph is marked upon to indicate the area to be cropped. The recorded information is subsequently sent, along with the photograph, to a photo laboratory where the preselected area of the photograph is enlarged. It would be desirable to provide a system which facilitates the generation and recordation of photo cropping information for accurately isolating the photo area to be enlarged at a later time and/or communication of such information to a recipient who may be ultimately responsible for the enlargement of the selected area of the photo.

Accordingly, it is an object of the present invention to provide a new and improved system and method for generating and codifying photo cropping and enlargement information facilitating the gathering and recording of such information so that with the information, a selected area of the photo can be accurately isolated at a later time.

Another object of the present invention is to provide such a system which is particularly well-suited for the communication of photo cropping and enlargement information to a recipient who is responsible for the enlargement of a selected area of the photo.

Still another object of the present invention is to provide such a system which enables an individual to readily isolate an area of a photo for cropping purposes and which does not require that the photo be marked upon.

Yet another object of the present invention is to provide such a system which is economical to construct and uncomplicated to use.

SUMMARY OF THE INVENTION

This invention resides in a system and method for generating and codifying cropping and enlargement information for a rectangular photo and transfer of such information to a remote location for use in the reproduction of such photo.

The system includes at least one transparent overlay and a grid board for underlying the overlay. The overlay includes means defining a plurality of concentric rectangular windows arranged about a common center and identification indicia associated with each rectangular window. Each window is sized to correspond to a fraction of a predetermined photo size so that by enlarging the size of the window by a preselected multiple, the window size is equal to the predetermined photo size. In addition, each rectangular window is arranged so that two of its opposite sides are generally parallel to two sides of the other rectangular windows of the overlay so that by placing the overlay over a photo and viewing an area of the photo through the plurality of windows as the photo area is substantially centered beneath the common center of the windows, the viewer may readily select one of the rectangular windows as the one window which most suitably frames the photo area.

The grid board of the system has a flat surface and means defining a pair of intersecting lines viewable on the flat surface and which are disposed at a right angle to one another and which intersect so as to divide the flat surface into four quadrants. The board also includes means defining a pattern of markings associated with the intersecting lines which provide one of the four quadrants with a two-coordinate grid wherein each of the two coordinate axes of the grid is parallel to a corresponding one of the intersecting lines and indicia for identifying coordinate locations on the grid. The transparent overlay is positionable over the flat surface of the board so that when the overlay is arranged in overlying relationship with the board surface so that the common center of the rectangular windows overlies the intersection of the intersecting lines of the grid board and each side of each rectangular window is parallel to one of the two coordinate axes of the grid, one corner of each rectangular window overlies the grid of the grid board.

To use the system, the transparent overlay and a rectangular photo having an area desired to be enlarged are positioned upon the board surface so that the photo is positioned between the overlay and the board surface and so that the common center of the rectangular windows of the overlay overlies the intersection of the intersecting lines of the grid board and each side of each rectangular window is parallel to one of the two coordinate axes of the grid. While maintaining each edge of the photo in a parallel relationship with a corresponding one of the two coordinate axes of the grid and maintaining the positional relationship between the overlay and the board surface, the photo is manipulated between positions beneath the transparent overlay until the photo area desired to be enlarged is suitably framed by one of the rectangular windows of the overlay. At that point, the identity of the one rectangular window of the transparent overlay chosen as suitably framing the photo area is noted and the location on the grid overlain by a corner of the photo is also noted. With the noted information, the photo area desired to be enlarged can be accurately isolated with the system at a later time.

BRIEF DESCRIPTION OF THE DRAWINGS

FIG. 6 is a plan view of the flat surface of the grid board of the FIG. 1 system.

FIG. 7 is a cross-sectional view taken about on line 7—7 of FIG. 6.

FIG. 8 is a view of the FIG. 1 system being used to select an area of a photograph to be enlarged.

DETAILED DESCRIPTION OF AN ILLUSTRATIVE EMBODIMENT

Figure 1:
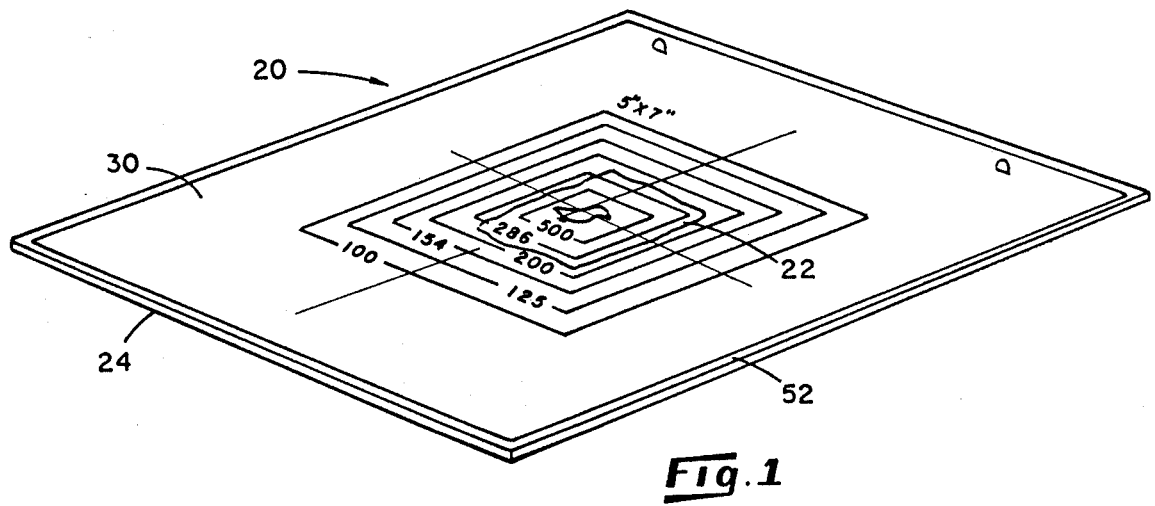
FIG. 1 is a perspective view of an embodiment of a system used to obtain cropping and enlargement information for a rectangular photograph.

Turning now to the drawings in greater detail, there is illustrated in FIG. 1 an embodiment of a system 20 used for generating and codifying cropping and enlargement information relating to a rectangular photograph 22. In the depicted illustration, the photograph 22 is a snapshot which has an area which is desired to be enlarged to a predetermined size. As will be apparent herein, the system 20 enables a selected area of the photo 20 to be readily chosen and information regarding the chosen area, such as its precise location on the photo, to be codified so that the chosen area of the photo may be accurately isolated at a later time for enlargement to a desired size.

With reference to FIGS. 1-4, the system 20 includes a grid board 24 and a series of transparent overlays 30, 32, 34 and 36 for use with the board 24. Each transparent overlay 30, 32, 34 or 36 corresponds to a predetermined photograph size to which an area of the photo 22 may be enlarged and in the illustrated system 20, corresponds to a standard rectangular photo size. More specifically, the overlay 30 corresponds to a preselected photo size having rectangular edges which measure 5.0 inches by 7.0 inches; the overlay 32 corresponds to a preselected photo size having rectangular edges which measure 8.0 inches by 10.0 inches; the overlay 34 corresponds to a preselected photo size having rectangular edges which measure 11.0 inches by 14.0 inches; and the overlay 36 corresponds to a preselected photo size having rectangular edges which measure 16.0 inches by 20.0 inches.

As will be apparent herein, the system 20 is used by first selecting the size of the photograph to which an area of the photo 22 is desired to be enlarged. Once the photograph size is selected, the transparent overlay which corresponds to that photograph size is used with the grid board 24. Thus, a system embodiment in accordance with the broader aspects of this invention may include only one transparent overlay, but the advantage provided by the series of overlays 30, 32, 34 or 36 relates to the plurality of choices: of enlargement sizes from which the user of the system may select.

Each overlay 30, 32, 34 or 36 is constructed of a flexible, yet durable sheet of plastic material which is relatively square in shape. In the depicted system 20, the edges of each overlay are about 14.0 inches long. In addition, each overlay 30, 32, 34 or 36 includes a pair of apertures 38 disposed adjacent the top edge of the overlay for a purpose apparent herein. In the embodiment 20, each aperture 38 is somewhat oval in shape.

Figure 2:
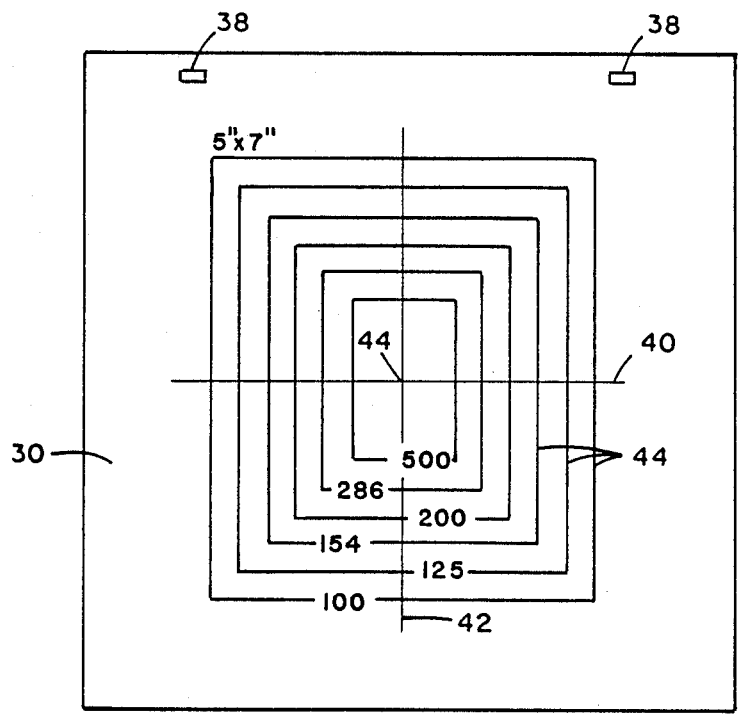
FIG. 2 is a plan view of the front face of the transparent overlay of the FIG. 1 system.
Figure 3:
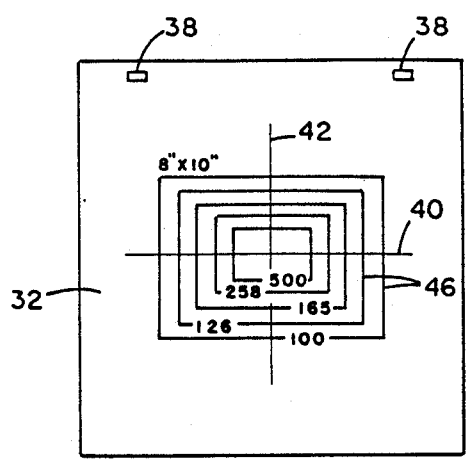
FIGS. 3–5 are views similar to that of FIG. 2 illustrating the front faces of extra overlays of the FIG. 2 system, but drawn to a smaller scale.
Figure 4:
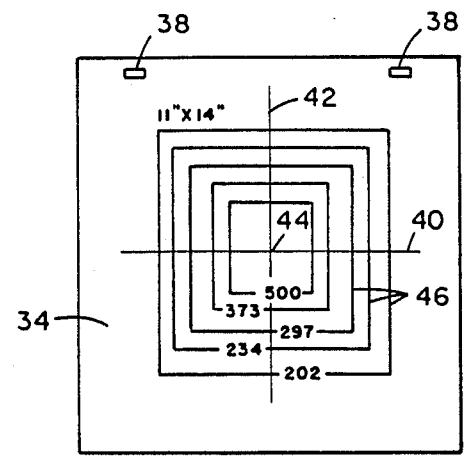
Figure 5:
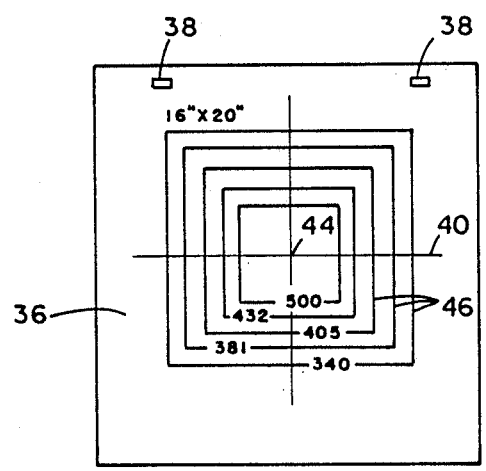

As exemplified by the overlay 30 of FIG. 2, each overlay 30, 32, 34 or 36 includes means defining two intersecting lines 40, 42 disposed at a right angle with respect to one another and which intersect at a point 44 which corresponds generally to the center of the overlay. The intersecting lines 40, 42 are printed on one side of the overlay sheet so as to be visible through the front surface of the overlay sheet. Each overlay 30, 32, 34 or 36 also includes means defining a plurality of concentrically-arranged rectangular windows 46 having a common center which coincides with the intersection 44 of the lines 40, 42. The side of each window 46 is provided by lines which are printed on one side of the overlay sheet and which are joined together at the window corners to form the rectangular boundary around the window 46. Preferably, each overlay 30, 32, 34 or 36 includes at least five rectangular windows 46.

Each overlay 30, 32, 34 or 36 also includes identifying indicia 48 for separately identifying each window 46. In the system 20, the indicia 48 includes a numeral associated with each window 46 wherein the numeral designates the percentage multiple to which the rectangular window must be enlarged to enlarge the size of the window to the photo size to which the overlay corresponds. The numerals printed upon the overlay 30 range from 100 to 500 wherein the rectangular window 46 identified by the numeral designation 100 has edge dimensions which measure 5.0 inches by 7.0 inches, i.e., the actual photo size to which the overlay 30 corresponds. On the other hand, the size of the rectangular window 46 designated by the numeral 500 must be enlarged by five hundred percent to render the edge dimensions of this window equal to 5.0 inches by 7.0 inches.

With reference to FIGS. 6 and 7, the grid board 24 includes a rigid, generally square platen 50 having a smooth, flat front surface 52 and a flat rear surface 54. Associated with the platen 50 are indicia 56 including a pair of intersecting lines 58, 60 disposed at a right angle with respect to one another and which intersect at point 62 located at about the center of the platen surface 52. One line 58 is parallel to the top and bottom edges of the platen 50, and the other line 60 is parallel to the side edges of the platen 50 so that the lines 58, 60 mark off the front surface 52 of the platen 50 into four quadrants. The grid board indicia 56 also includes a pattern of intersecting lines 64 which provide one of the four quadrants with a two-coordinate grid 66 wherein one coordinate of the grid 66 is parallel to one intersecting line 58 and the other coordinate of the grid 66 is parallel to the other intersecting line 60.

Figure 9:
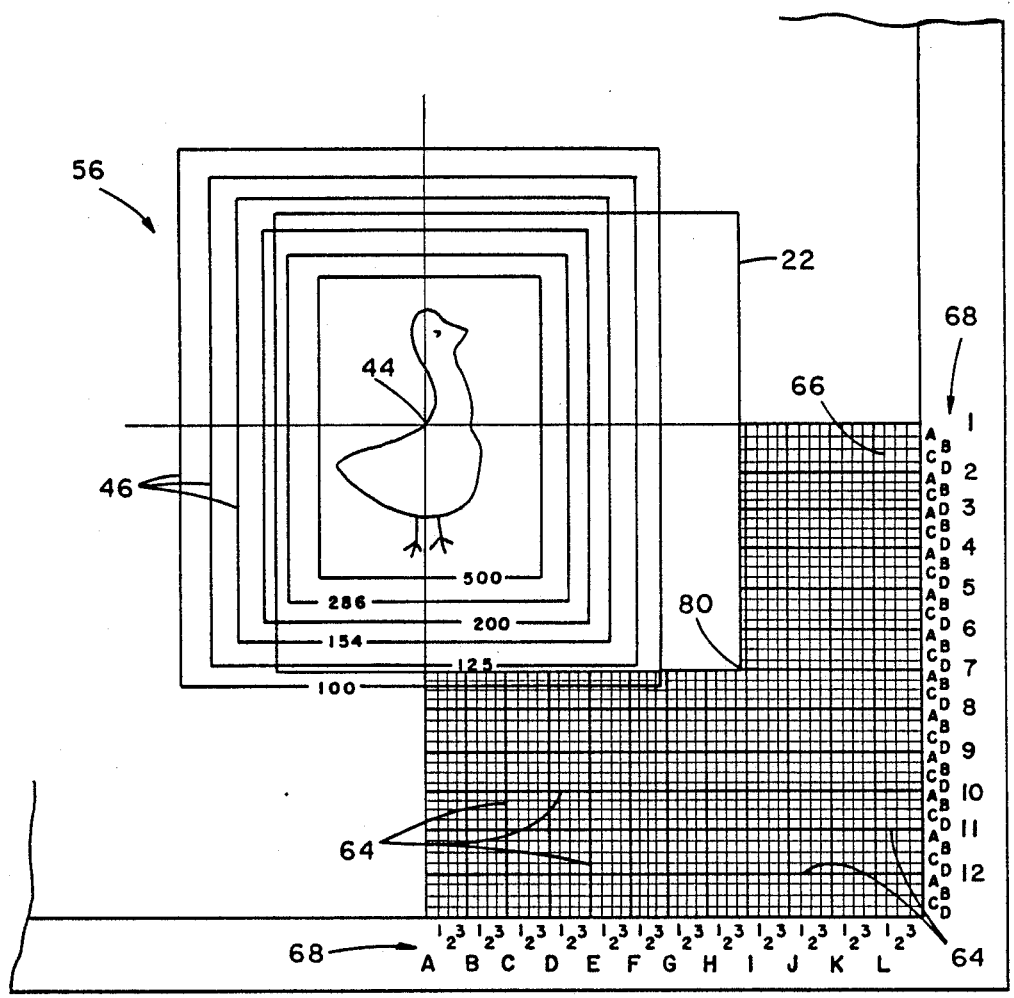
FIG. 9 is a view of a fragment of the FIG. 1 system and a photograph wherein the photograph has been positioned in a desired location beneath the transparent overlay of the system.

With reference still to FIG. 6, there is associated with the grid 66 markings 68 enabling an individual to identify any coordinate location on the grid 66 with two coordinate information. In the depicted embodiment 20, the grid locations are identified by a series of letters and numerals extending along the left and bottom edges, as shown in FIGS. 6 and 9, of the grid 66. Also outlined in dotted lines upon the board surface 52 are printed outlines 70, in actual size, of the edges of preselected photos wherein each photo is centered about the intersection 62 of the lines 58, 60.

As best shown in FIG. 7, the platen 50 of the board 24 is comprised of a rigid layer of transparent plastic, and the indicia 56 is printed upon an opaque plastic sheet 72 which is laminated to the rear surface 54 of the platen 50 so that the indicia 56 printed upon the sheet 72 are visible through the front surface 52 of the platen 50. In the depicted system 20, each edge of the platen 50 is about 15.0 inches long.

The board 24 also includes a bracket 74 which is glued or otherwise affixed to the platen 50 adjacent its top edge for securing an overlay in position upon the platen surface 52. The bracket 74 has two cylindrically-bodied posts, or lugs 76, which extend generally away from the platen surface 52 and which ar sized to snugly accept the apertures 38 of an overlay placed upon the surface 52. Therefore, when an overlay is placed in overlying relationship with the platen surface 52 and the overlay apertures 38 are snugly received by the bracket lugs 76, one edge, i.e. the top edge, of the overlay and platen 50 cooperate to releasably secure the overlay in position over the platen surface 52. For a reason apparent herein, the lower edge of the overlay is free to be lifted from the platen surface 52 in the manner illustrated in FIG. 8.

To use the system 20, an individual must first select the size to which an area of the photo 22 is desired to be enlarged. It will be assumed for exemplary purposes that an area of the photo 22 is desired to be enlarged to a standard photo size having edges which measure 5.0 inches by 7.0 inches. Accordingly and with reference again to FIG. 1, the transparent overlay 30 which corresponds to the 5.0 inch by 7.0 inch photo size is placed in overlying relationship with the grid board 24 with its apertures 38 snugly positioned about the lugs 76 of the board bracket 74. The photo 22 is then positioned face-up between the overlay 30 and platen surface 52 by lifting one corner of the overlay 30, as viewed in FIG. 1, and sliding the photo 22 edgewise between the overlay 30 and the platen surface 52 so that the photo is viewed in the correct orientation through the overlay 30.

With the lower edge of the overlay 30 lifted to an elevated condition as shown in FIG. 8, the photo 22 is shifted between positions upon the platen surface 52 until the user centers the area of the photo 22 desired to be enlarged beneath the common center 44 of the rectangular windows 46 of the overlay 30. It will be understood that during this manipulation step, each edge of the photo 22 is maintained in a parallel relationship with a corresponding one of the coordinates of the grid 66 and the cooperation between the bracket lugs 76 and overlay apertures 38 maintain the positional relationship between the overlay 30 and board surface 52. The user then replaces the lower edge of the overlay upon the board surface 32 and chooses one of the rectangular windows 46 which best frames the photo area to his satisfaction. Once the one window 46 is chosen which best frames the desired area, a record is made of the indicia numeral corresponding to the chosen window 46. Thus, by recording the numeral associated with the chosen window 46, the user records the percentage multiple by which the size of the chosen window 46 must be increased to enlarge the area of the chosen window to a 5.0 inch by 7.0 inch photo size, as well as the identity of the chosen window 46.

It will be understood that as the selected area of the photo 22 is centered beneath the center 44 of the overlay windows 46 for selection of the window 46 which most suitably frames the photo area, one corner, i.e., the lower, righthand corner, of the photo 22 overlies the grid 66 of the board 24 as best shown in FIG. 9. In accordance with the use of the system 20, a notation is made of the grid location overlain by the corner of the photo 22. The grid location overlain by the photo corner is indicated 80 in FIG. 8 and can be identified, of course, by the numerals and letters bordering the left and bottom edges of the grid 66 for identifying in a conventional manner any location on the grid 66 crossed by the grid lines 64.

With information in hand of the desired photo size of the area of the photo 22 to be enlarged (i.e., 5.0 inches by 7.0 inches), the numeral which identifies the rectangular window 46 which best frames the photo area and the percentage multiple by which the size of the chosen window must be enlarged, and the grid location overlain by the appropriate corner of the photo 22, an individual possesses sufficient information to accurately isolate the selected area of the photo 22 for enlargement at a later time.

To isolate the selected area of the photo 22 at a later time with the aforementioned noted information, an individual places the photo 22 correct-side-up on the board surface 52 so that the lower, right hand corner of the photo 22 is positioned over the location 80 of the grid 66 corresponding to the coordinate information noted to designate the coordinate location on the grid 66 previously overlain by the lower, right hand corner of the photo. The appropriate transparent overlay 30 which corresponds to the photo size to which the selected photo area is to be enlarged is then placed in overlying relationship with the photo 22 and board surface 52 so that its apertures 38 are positioned about the bracket lugs 76. With the appropriate overlay positioned over the photo, the rectangular window 46 chosen as the one which best frames the photo area isolates the area. Of course, the indicia numeral used for identifying the window also provides the enlargement multiple by which the isolated area must be enlarged to provide the desired enlargement.

The aforedescribed features of the system 20 which enable a preselected area of a photo to be accurately isolated at a later date can be readily appreciated when considering the fact that an individual responsible for selecting the area of the photo 22 to be enlarged and the size of the enlargement may not be the individual who is ultimately responsible for enlarging the photo 22. Commonly, for example, the selected area of a photograph is isolated and the desired enlargement size is selected at the counter of a photo shop, and the photograph is subsequently delivered to a photo laboratory where the enlargement is formed. By equipping each of the photo shop and the laboratory with a system whose components are identical to those of the system 20, the photo cropping and enlargement information generated at the photo shop may simply be passed on, with the photo, to the laboratory where the desired photo area may be accurately isolated and enlarged to the desired size.

Commonly, a mounting board is used in a photo laboratory upon which a photo is supported in a stationary position in front of a camera used for shooting the enlargement photo. By utilizing the grid board 24 of the system 20 as the mounting board in such a laboratory set-up, the laboratory technician can, with the grid information supplied with the photo 22, accurately position the photo 22 upon the board surface 52, and with the supplied enlargement factor information, appropriately set the enlargement factor of his camera and then simply shoot the picture. Such a procedure eliminates all guess work as to what subject matter of the photo 22 should be contained within the borders of the enlargement.

Along the same lines, the dotted line rectangular outlines 70 (FIG. 7) of the board 24 may be used by the laboratory technician to properly position a photo on the board surface 52 if the enlargement is to include the full content of the photo.

It will be understood that numerous modifications and substitutions may be had to the aforedescribed embodiments without departing from the spirit of the invention. For example, the transparent overlay 30 is described as being used in the aforementioned example to enlarge the preselected area of the photo 22 to a 5.0 inch by 7.0 inch photo, bit it will be understood that in an instance where it is desired to enlarge a preselected photo area to a photo size whose edges measure 8.0 inches by 10.0 inches, the transparent overlay 32 would be used with the board 24. Accordingly, the aforedescribed embodiments are intended for the purpose of illustration and not as limitation.

I claim:

1. A system for generating and codifying cropping and enlargement information for a rectangular photo comprising:

at least one transparent overlay including means defining a plurality of rectangular windows arranged about a common center and identification indicia associated with each window, each window being sized to correspond to a fraction of a predetermined photo size so that by enlarging the size of the window by a preselected multiple, the window size is equal to the predetermined photo size, each rectangular window being arranged so that two of its opposite sides are generally parallel to two sides of the other rectangular windows of the overlay so that by placing the overlay over a photo and viewing an area of the photo through the plurality of windows being the photo area is substantially centered beneath the common center of the rectangular windows, the viewer may readily select one of the rectangular windows as the one window which most suitably frames the photo area; and a grid board having a flat surface and means defining a pair of intersecting lines viewable on the flat surface and which are disposed at a right angle to one another and which intersect so as to divide the flat surface into four quadrants, the board also including means defining a pattern of markings associated with the intersecting lines which provide one of the four quadrants with a two-coordinate grid wherein each of the two coordinate axes of the grid is parallel to a corresponding one of the intersecting lines and indicia for identifying coordinate locations on said grid;

the transparent overlay being positionable over the flat surface of the board so that when the transparent overlay is arranged in overlying relationship with the board surface so that the common center of the rectangular windows overlies the intersection of the intersecting lines of the board and each side of each rectangular window is parallel to one of the two coordinate axes of the grid, one corner of each rectangular window overlies the grid of the grid board;

so that by positioning the transparent overlay upon the flat surface of the board, manipulating a photo having an area to be enlarged between the overlay and the board surface while maintaining the positional relationship between the overlay and board and maintaining each edge of the photo in a parallel relationship with one of the coordinate axes of the grid until the area to be enlarged is framed by one of the rectangular windows chosen as the window which most suitably frames the photo area, noting the chosen one of the rectangular windows and the location on the grid overlain by a corner of the photo, the viewer possesses sufficient information for accurately isolating at a later time the photo area desired to be enlarged.

2. The system as defined in claim 1 wherein the transparent overlay and the board include cooperating means for securing an edge of the overlay to the board to thereby maintain the positional relationship between the overlay and the board surface.

3. The system as defined in claim 2 wherein the cooperating means includes a pair of lugs associated with one of the overlay and the board and the other of the overlay and board includes means defining a pair of apertures for snugly accepting the lugs when the overlay is positioned over the board surface so that the positional relationship between the overlay and the board surface is maintained by the cooperation between the lugs and the apertures.

4. The system as defined in claim 3 wherein the lugs are associated with the board and the apertures are provided in the overlay, and the lugs and apertures are disposed in such a relationship that when the lugs are accepted by the apertures, one edge of the overlay is secured against the board surface.

5. The system as defined in claim 1 wherein there are at least five rectangular windows provided on the transparent overlay.

6. The system as defined in claim 1 including at least two transparent overlays, the rectangular windows provided on one of the overlays corresponding to fractions of one predetermined photo size and the rectangular windows provided on the other of the overlays corresponding to fractions of another predetermined photo size.

7. The system as defined in claim 1 wherein the identification indicia associated with each window denotes the enlargement factor necessary to enlarge the window to the predetermined photo size so that by noting the chosen one of the rectangular windows by its identification indicia, the enlargement factor necessary to enlarge the window to the predetermined photo size is also noted.

8. A method for generating and codifying cropping and enlargement information for a rectangular photo so that a preselected area of the photo can be accurately isolated at a later time for enlargement purposes, said method comprising the steps of:

providing a transparent overlay including means defining a plurality of rectangular windows arranged about a common center and identification indicia associated with each window, each window being sized to correspond to a fraction of a predetermined rectangular photo size so that by enlarging the size of the window by a preselected multiple, the window size is equal to the predetermined photo size, each rectangular window having two opposite sides which are arranged generally parallel to two sides of the other rectangular windows of the overlay;

providing a grid board having a flat surface and means defining a pair of intersecting lines viewable on the flat surface and which are disposed at a right angle to one another and which intersect so as to divide the flat surface into four quadrants, the board also including means defining a pattern of markings associated with the intersecting lines which provide at least one of the four quadrants with a two-coordinate grid wherein each of the two-coordinate axes of the grid is parallel to a corresponding one of the intersecting lines and indicia for identifying coordinate locations on the grid;

positioning the transparent overlay and the photo over the board surface so that the photo is positioned between the overlay and the board surface and so that the common center of the rectangular windows of the overlay overlies the intersection of the intersecting lines of the grid board and each side of each rectangular window is parallel to one of the two coordinate axes of the grid;

manipulating the photo between positions beneath the transparent overlay while maintaining each edge of the photo in a parallel relationship with a corresponding one of the two coordinate axes of the grid and maintaining the positional relationship between the overlay and the board surface until the photo area desired to be enlarged is suitably framed by one of the rectangular windows of the overlay;

noting the identity of the one rectangular window chosen as suitably framing the photo area; and noting the location on the grid overlain by a corner of the photo.

* * * * *